J. ZENISHEK.
AUTO LIGHT CONTROLLING DEVICE.
APPLICATION FILED DEC. 2, 1920.
1,387,579.
Patented Aug. 16, 1921.
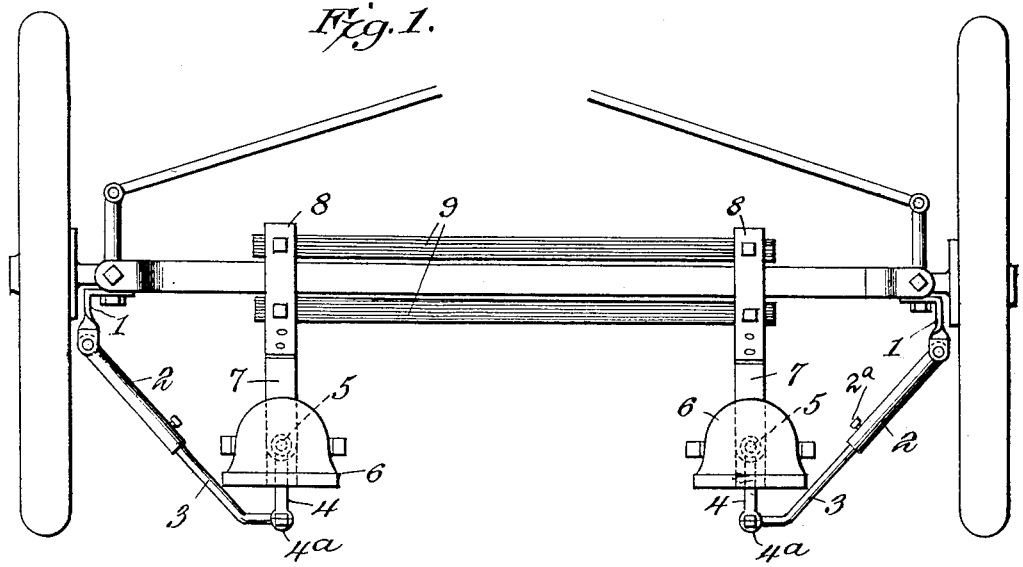
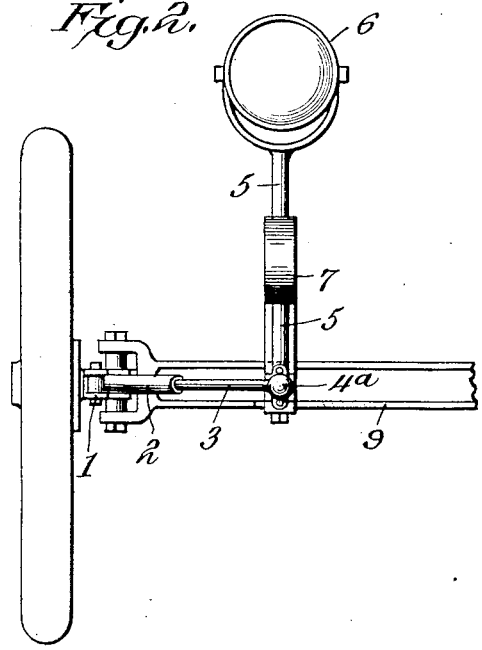
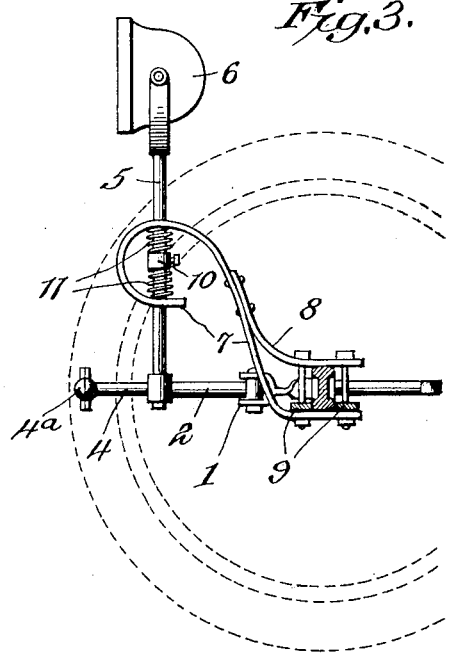
INVENTOR
John Zenishek
BY James J. Sheehy & Co.
ATTORNEYS

UNITED STATES PATENT OFFICE.

JOHN ZENISHEK, OF SOLON, IOWA.

AUTO-LIGHT-CONTROLLING DEVICE.

1,387,579.   Specification of Letters Patent.   Patented Aug. 16, 1921.

Application filed December 2, 1920. Serial No. 427,816.

*To all whom it may concern:*

Be it known that I, JOHN ZENISHEK, a citizen of the United States, residing at Solon, in the county of Johnson and State of Iowa, have invented new and useful Improvements in Auto-Light-Controlling Devices, of which the following is a specification.

My present invention pertains to head-light control and more particularly to headlights such as are used on motor vehicles, and the like and it contemplates the provision of a simple and inexpensive device whereby the rays of light from the head-light will be thrown in the direction the vehicle is traveling.

The invention further contemplates the provision of a light controlling mechanism that is adjustable to any size of light or vehicle.

The invention in all of its details will be fully understood from the following description and claims when the same are read in connection with the drawings forming part hereof, in which:

Figure 1 is a top plan view of my novel mechanism as applied to the axle and spindle of a motor vehicle.

Fig. 2 is a front elevation of one vehicle lamp and its arrangement on the controlling mechanism.

Fig. 3 is a side elevation of one lamp and showing in section a portion of the axle and side elevation of my novel construction.

Similar numerals of reference represent corresponding parts in all the views of the drawings.

To the ordinary well known spindle to which the front wheel of a motor vehicle is secured, I attach an L-shaped arm 1; the said arm being so constructed that the bolt of the spindle will pass through one end of said arm and the nut of the spindle is employed to securely retain the arm to the spindle and thereby assure movement of the spindle and arm in unison.

At its opposite end from the spindle, the arm 1 is connected by a slip joint by which a rod 2 is secured to the arm.

The rod 2 is hollow at one end and is adapted to receive an arm 3. This arm 3 is adjustable with respect to the rod 2 by a wing nut 2ª.

The arm 3 is further secured to a short rod 4 by means of a connection 4ª. This connection comprises a collar arrangement as illustrated.

Secured to the arm 4 is an upwardly or vertically extending portion 5 at the upper end of which is secured a head-light bracket for receiving the head-light 6.

In order to retain the head-light in proper vertical position, I provide the S-shaped brace 7 that extends from the underside of the front axle of the vehicle. The brace 7 by preference is of flat construction and arranged on the portion 5 between the points at which the portion 5 passed through the brace 7 is a collar 10 having an adjustable nut.

Interposed between the bends of the brace 7 are springs 11 that surround the portion 5 and bear at one end against the collar 10 and at their opposite end against the brace 7. The brace 7 is secured to a short flat brace 8 as illustrated and bars 9 that extend parallel with respect to the axle of the vehicle are provided, to which the braces 7 and 8 are held with respect to the axle.

It will be gathered from the foregoing that where the spindle on which the front wheels of the vehicle are arranged to turn, the arm 1 will turn in the same direction as the wheels. The lamp 6 will naturally be moved in the same direction as the vehicle wheels because of the construction of the members 2, 3, 4 and 5 and their relation to the spindle.

In order to compensate for jar and to preclude injury to the lamp 6, I provide the spring bracket brace 7 before described.

The elements of my device are constructed so as to be interchangeable and all friction is eliminated by milling the contacting portions, moreover, the adjustable feature of the various elements permits the use of my invention on any size or character of motor vehicle.

The device is simple and inexpensive to produce and attach and comprises no delicate parts such as are liable to become inoperative after a short period of use.

Having described my invention, what I claim and desire to secure by Letters Patent is:—

1. In head-light control means, the combination of spaced parallel bars adapted to be secured to the front axle of a vehicle, brace members secured at one end to the bars, a head-light receiving member supported by the brace members and adapted to rotate with respect to the brace members, a collar secured to the head-light receiving member, springs surrounding said member and confined between the one brace member and the collar, a rod secured to said light-receiving member, an arm secured to the rod, a second rod secured to the arm at one end and to another arm at its opposite end; said last-named arm being secured to and movable with respect to the spindle of the motor vehicle.

2. In head-light control means, the combination of a front axle of a vehicle, spaced bars adapted to be secured thereto, brace members secured to the bars, a head-light receiving member supported by the brace members and adapted to rotate with respect to said members, a collar on the head-light receiving member, springs surrounding the head-light receiving member and confined between one brace member and the collar, a rod secured to the head-light receiving member, and an arm and rod communicating with the head-light receiving member and the spindle of the vehicle.

In testimony whereof I have hereunto set my hand in presence of two subscribing witnesses.

JOHN ZENISHEK.

Witnesses:
W. F. MURPHY,
J. H. ROBERTS.